C. G. CASHMAN.
REAMER HEAD.
APPLICATION FILED JULY 9, 1915.

1,184,722.

Patented May 30, 1916.

Witnesses

Inventor
Clarence G. Cashman,
By Bradford & Doolittle,
Attorneys

UNITED STATES PATENT OFFICE.

CLARENCE G. CASHMAN, OF WAYNESBORO, PENNSYLVANIA.

REAMER-HEAD.

1,184,722.

Specification of Letters Patent.

Patented May 30, 1916.

Application filed July 9, 1915. Serial No. 38,992.

*To all whom it may concern:*

Be it known that I, CLARENCE G. CASHMAN, a citizen of the United States, residing at Waynesboro, Franklin county, and State of Pennsylvania, have invented and discovered certain new and useful Improvements in Reamer-Heads, of which the following is a specification.

My said invention consists in certain improvements in the details of construction and arrangement of parts of reamer heads of that type wherein the reamer blades are carried in radial seats and are radially adjustable, my improvements relating more particularly to the means of adjustably securing said reamer blades, whereby a very efficient and easily operated tool of the character described is provided, all as will be hereinafter more fully described and claimed.

Figure 1:
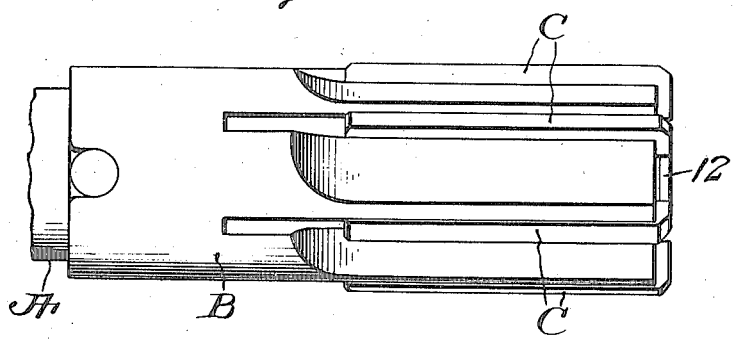
Figure 3:
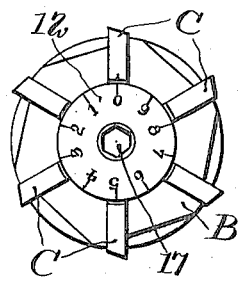
Figure 2:
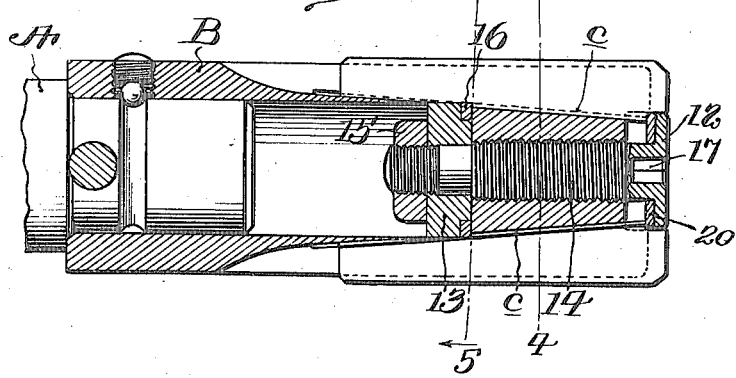
Figure 4:
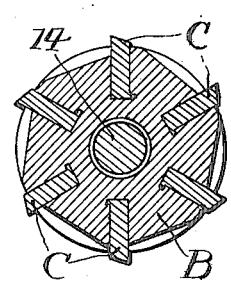
Figure 5:
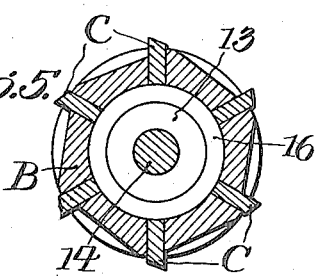
Figure 6:
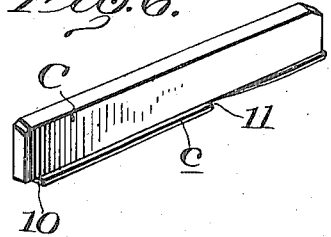

Referring to the accompanying drawings which are made a part hereof, and on which similar reference characters indicate similar parts; Figure 1 is a side elevation of a reamer head constructed in accordance with my said invention, Fig. 2 a central longitudinal section through said reamer head, Fig. 3 a face view, Fig. 4 a cross section on the dotted line 4—4 in Fig. 2, Fig. 5 a cross-section on the dotted line 5—5 in Fig. 2, and Fig. 6 a perspective view showing one of the reamer blades separately. In said drawings, the portions marked A represent the machine spindle on which the reamer head is mounted, B the body of said reamer head, and C the reamer blades.

In the main, the reamer head is of a common type and will not require any special description. It consists of a cylinder appropriately formed for mounting on the machine mandrel and for carrying the reamer blades. It is provided with longitudinal grooves, or seats, arranged equidistant apart around its periphery and adapted to receive and hold the reamer blades. Said seats or grooves are formed with bottoms inclined downward from rear to front, and the reamer blades are formed with complementary tapered inner edges. Said seats are also provided with grooves in one side thereof. Said reamer blades C are of the form more clearly shown in Fig. 6, having a longitudinal rib $c$ along the lower edge, adapted to engage and interlock with the groove in the side of each seat to hold them from radial displacement.

Each reamer blade is formed with a shoulder 10 near its front end and another shoulder 11 at a point toward its rear end, behind the solid part of forward end of the body B. Said blades are securely clamped by means of said shoulders, between the head 12 and a collar 13 on a screw-threaded member 14, a friction washer 20 being preferably interposed between head 12 and the shoulders 10 of the blades. Said member 14 is mounted in a screw-threaded perforation centrally located in said head. A clamping nut 15 is mounted on the inner end of said screw-threaded member 14, adapted to operate against collar 13, and a friction ring 16 is interposed between the shoulder 11 and said collar 13. Said screw-threaded member 14 is formed with a central socket 17, rectangular in cross-section, by which a tool or wrench (not shown) may be inserted for turning the same.

The tool is assembled by placing the reamer blades in the seats or grooves provided therefor in the head, with the ribs $c$ in the recesses in the sides of said seats, and then clamping said reamer blades to the screw-threaded member 14 by the means just described. It will thus be seen that the turning of said member 14 will slide the reamer blades back and forth, and as they slide over the inclined floors of their seats or grooves, or are guided by the interlocking side connections, they will be drawn inwardly, or forced outwardly, as the case may be, by said formation.

Having thus fully described my said invention, what I claim as new and desire to secure by Letters Patent, is:

1. A reamer head comprising a body formed with longitudinal grooves extending in a radial direction into said body and spaced equidistant apart around its periphery, reamer blades mounted in said grooves, said blades and the supports for their inner edges being formed so that relative longitudinal movement effects radial adjustment of the blades, and a screw-threaded member mounted in a screw-threaded perforation in said body and clamped to said reamer blades, whereby the turning of said screw-threaded member will operate to slide said reamer blades back and forth, substantially as set forth.

2. A reaming tool comprising a body formed with longitudinal grooves for the reamer blades, said grooves being formed with inclined supports, reamer blades mounted in said grooves with inclined or tapered edges resting upon said supports, and an adjustable member mounted in said body and clamped to said reamer blades, substantially as set forth.

3. A reaming tool comprising a body formed with longitudinal grooves with inclined supports for the reamer blades, said reamer blades mounted to slide in said grooves on said supports, and a screw-threaded member mounted in said body and clamped to said reamer blades for adjusting them longitudinally and radially, substantially as set forth.

In witness whereof, I have hereunto set my hand and seal at Waynesboro, Pennsylvania, this nineteenth day of May, A. D. nineteen hundred and fifteen.

CLARENCE G. CASHMAN. [L. S.]

Witnesses:
 VINCENT HOUFF,
 ALF. N. RUSSELL.